(12) United States Patent
Kim

(10) Patent No.: US 7,486,613 B2
(45) Date of Patent: Feb. 3, 2009

(54) PROTECTION-SWITCHING APPARATUS AND METHOD IN ASYNCHRONOUS TRANSFER MODE SYSTEM WITH RING TOPOLOGY

(75) Inventor: Yong-Hoe Kim, Anyang (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1146 days.

(21) Appl. No.: 10/301,642

(22) Filed: Nov. 22, 2002

(65) Prior Publication Data
US 2003/0099191 A1 May 29, 2003

(30) Foreign Application Priority Data
Nov. 29, 2001 (KR) ............................. 2001-74986

(51) Int. Cl.
*G01R 31/08* (2006.01)
(52) U.S. Cl. ............... 370/222; 370/395.1; 370/224; 370/227; 709/239
(58) Field of Classification Search .......... 370/222, 370/395.1, 397, 227, 224, 217, 225, 395; 385/16; 709/239
See application file for complete search history.

(56) References Cited

U.S. PATENT DOCUMENTS

| | | | | |
|---|---|---|---|---|
| 5,627,836 A * | 5/1997 | Conoscenti et al. | .......... | 370/397 |
| 5,838,924 A * | 11/1998 | Anderson et al. | .......... | 709/239 |
| 5,870,382 A | 2/1999 | Tounai et al. | | |
| 5,949,755 A * | 9/1999 | Uphadya et al. | .......... | 370/224 |
| 6,011,780 A | 1/2000 | Vaman et al. | | |
| 6,256,292 B1 * | 7/2001 | Ellis et al. | .......... | 370/227 |
| 6,317,414 B1 | 11/2001 | Naohiro | | |
| 6,356,557 B1 | 3/2002 | Nichols et al. | | |
| 6,553,034 B2 * | 4/2003 | Chan et al. | .......... | 370/397 |
| 6,680,912 B1 * | 1/2004 | Kalman et al. | .......... | 370/238 |

(Continued)

FOREIGN PATENT DOCUMENTS

KR 2001-003433 1/2001

(Continued)

OTHER PUBLICATIONS

"The Token-Bank Leaky Bucket Mechanism for Group Connections in ATM Networks" by Sheng-Lin Wu and Wen-Shyen E. Chen.

(Continued)

*Primary Examiner*—Duc C Ho
(74) *Attorney, Agent, or Firm*—Robert E. Bushnell, Esq.

(57) ABSTRACT

The present invention discloses a protection-switching apparatus and method in an asynchronous transfer mode (ATM) system with ring topology. In the invention, the ONU detects a trouble, or abnormal states, of an optical path connected with the ONU itself; the ONU performs the protection-switching function by receiving an ATM cell from the opposite direction of the optical path having the trouble; the software unit of the ONU inserts a node identification data (NID) of the ONU to the APS register of the optical path of normal states; and the hardware unit of the ONU generates the APS cell by performing mirroring of the APS register to the VCI area of the APS cell, and transmits the APS cell in the same direction as the direction of the optical path of abnormal states. Therefore, the protection-switching apparatus and method in an ATM system with ring topology of the present invention have the advantage of reducing switching delay time and switching load.

11 Claims, 10 Drawing Sheets

U.S. PATENT DOCUMENTS 6,775,228 B1 * 8/2004 Solana De Quesada ..... 370/217

OTHER PUBLICATIONS

"Effectiveness of the 'Leaky Bucket' Policing Mechanism in ATM Networks," *IEEE Journal on Selected Areas in Communications*, vol. 9, No. 3, by M. Butto, E. Cavallero, and A. Tonietti on Apr. 1991.
"*ATM User-Network Interface Specification—Version 3.1*" by George Dobrowski on Sep. 1994.
Annex A "*Guidelines for Use of ATM Address Formats*".
Annex B "*Compatibility Checking*".
Annex C "*B-LLI Negotiation*".
Annex D "*Transit Network Selection*".
Annex E "*Cause Definitions*".
Annex F "*ATM Adaption Layer Parameters Negotiation*".
Appendix A "*Quality of Service Guidelines*".
Appendix B "*Conformance Examples in a Traffic Contract*".
Appendix C "*Point-Multipoint Signalling Procedures Using Separate State Machines(Information)*".
Appendix D "*Example Signalling Codings*".
Appendix E "*Differences with ITU-T draft Recommendation Q.2931*".
Appendix F "*Guidelines on the use of Bearer Class, Traffic Parameters and QoS*".
Appendix G "*OAM Cell Error Detection Code Field*".
Appendix H "*Glossary*".

* cited by examiner

PROTECTION-SWITCHING APPARATUS AND METHOD IN ASYNCHRONOUS TRANSFER MODE SYSTEM WITH RING TOPOLOGY

CLAIM OF PRIORITY

This application makes reference to, incorporates the same herein, and claims all benefits accruing under 35 U.S.C. §119 from an application for PROTECTION SWITCHING METHOD OF ATM SYSTEM HAVING A RING CONFIGURATION earlier filed in the Korean Industrial Property Office on 29 Nov. 2001 and there duly assigned Serial No. 2001-74986.

BACKGROUND OF THE INVENTION

1. Field of the Invention

The present invention relates to an asynchronous transfer mode ATM system with ring topology, and more particularly, to a protection-switching apparatus and method relative to an ATM cell of the ATM system.

2. Description of the Related Art

Recently, a communication service is upgraded from a voice service, such as a telephone, to a data service, such as Internet, videophone, video on demand (VOD), and so on.

Because the conventional network, such as an integrated service digital network (ISDN) or a leased line, used in the conventional data service allocates a specified frequency to a subscriber forcibly, it is difficult to apply the conventional network to a recent data communication service, such as Internet, requesting an intermittent and a little data flow. Therefore, an asynchronous transfer mode (ATM) system has been requested. One of the ATM systems is a fiber loop carrier-C (FLC-C) system developed by the lead of Korea Telecom (KT).

The FLC-C includes a host digital terminal (HDT) and numerous optical network units (ONUs) with star topology, and performs protection-switching function to an optical fiber line. To be applied to service area and situations, the FLC-C is improved to ring topology and to double star topology. However, up to these days, the HDT and the ONU with ring topology are only used in a communication method of a synchronous digital hierarchy (SDH). Therefore, for the ATM method, not only is an international standard not prepared completely, but also a commercial product does not exist.

The general protection-switching method is described in Korean Patent Application No. 1999-23730 entitled "Protection-Switching Method in Asynchronous Transfer Mode With Ring Topology", dated on 23 Jun. 1999, by the inventor of this application, in detail.

The conventional FLC-C system with ring topology depends on software program to detect, insert and switch in protection the APS cell entirely. Therefore, the FLC-C system has a problem that the process time is delayed.

SUMMARY OF THE INVENTION

It is therefore an object of the present invention to provide a protection-switching apparatus and method in an asynchronous transfer mode ATM system with ring topology, generating, detecting, inserting, and switching in protection relative to an ATM cell in both software and hardware. Therefore, the method of the present invention has a simple structure, and reduces a delay time.

It is another object to provide an ATM system with ring topology to perform protection-switching operation by referring the data inserted in the APS cell only in order for a load for performing protection-switching operation to be reduced.

To overcome the above described and other problems and to satisfy the above and other objects, preferred embodiments of the present invention provide a protection-switching apparatus and method in an asynchronous transfer mode (ATM) system with ring topology, using an auto protection switching APS cell including a virtual channel identifier (VCI) to store data of an optical path having abnormal or normal states, in the case where the ATM system transmitting the same ATM cell in both directions is connected in ring shape with a host digital terminal (HDT) and numerous optical network units (ONUs). Each of the ONUs includes: a hardware unit; a software unit, both the hardware and the software unit generating the APS cell; and an APS register from/to which mirroring of the VCI area of the APS cell is performed by the hardware unit, and which is read and set by the software unit. The protection-switching apparatus and method of an ONU include: in the ONU, detecting a trouble, or abnormal states, of an optical path connected with the ONU itself; in the ONU, performing the protection-switching function of receiving an ATM cell from the opposite direction of the optical path having the trouble; in the software unit of the ONU, inserting a node identification data (NID) of the ONU into the APS register of the optical path of normal states; and in the hardware unit of the ONU, generating the APS cell by performing mirroring of the APS register to the VCI area of the APS cell, and transmitting the APS cell in the same direction as the direction of the optical path of abnormal states.

In addition, the step of detecting abnormal states of an optical path includes: in the hardware unit of the ONU, detecting the optical signal of the optical path, generating an interrupt in the case where the optical signal is cut down, and informing of the abnormal states of the optical path to the software unit of the ONU; and, in the software unit of the ONU, detecting the intensity of the optical signal of the optical path and abnormal states of the optical path in the case where the intensity of the optical signal is lower than the critical value of the intensity.

In addition, the step of transmitting the APS cell by the hardware unit of the ONU includes, in the hardware unit of the ONU, transmitting the APS cell in periodic interval until a message of protection-switching completion is inputted from the HDT and the other ONUs.

Another object of the present invention is to provide a protection-switching method in an ATM system with ring topology, using an auto protection switching APS cell including a virtual channel identifier (VCI) to store data of an optical path having abnormal or normal states, in the case where the ATM system transmitting the same ATM cell in both directions is connected in ring shape with a host digital terminal (HDT) and numerous optical network units (ONUs), wherein each of the ONUs includes: a hardware unit; a software unit, both the hardware and the software unit generating the APS cell; and an APS register from/to which mirroring of the VCI area of the APS cell is performed by the hardware unit and which is read and set by the software unit. The protection-switching method of an ONU includes: in the hardware unit of the ONU, receiving the APS cell to perform mirroring of the VCI area of the APS cell to the APS register; in the software unit of the ONU, checking whether the APS cell is an alarm indication signal (AIS) or not; performing the protection-switching function to receive the APS cell of an ONU, having an abnormal optical path indicated in the VCI area of the APS cell, from the opposite direction of the optical path in the case where the APS cell is the AIS; in the software unit of the ONU, inserting node identification data (NID) of the ONU into the optical path having the APS register of normal states in the case where the APS cell is the AIS; and, in the hardware unit of the ONU, performing mirroring of the APS register to the VCI area of the APS cell so as to generate the APS cell again, and transmitting the APS cell in the direction of the optical path.

In addition, the protection-switching apparatus and method in the ATM system with ring topology further include, in the hardware unit of the ONU, performing mirroring of the APS cell to the APS register, generating an interrupt, and reporting the received data of the APS cell to the software unit of the ONU sequentially.

In addition, the step of checking whether the APS cell is the AIS or not, by the software unit of the ONU, includes the step, in the software unit of the ONU, of examining the bit of the identification position of a node transmitting the APS cell among all bits of the APS register to decide whether the APS cell is the AIS or not.

Another object of the present invention is to provide a protection-switching apparatus and method in an ATM system with ring topology, using an auto protection switching (APS) cell including a virtual channel identifier (VCI) to store data of an optical path having abnormal or normal states, in the case where the ATM system transmitting the same ATM cell in both directions is connected in ring shape with a host digital terminal (HDT) and numerous optical network units (ONUs), wherein the HDT includes: a hardware unit; a software unit, both the hardware and the software unit detecting the APS cell and generating the APS clear cell; and an APS register from/to which mirroring of the VCI area of the APS cell is performed mutually by the hardware unit, and which is read and set by the software unit. The protection-switching method of the HDT includes: in the HDT, detecting abnormal states of the optical path connected with the HDT; in the HDT, performing the protection-switching function receiving the ATM cell from the opposite direction of the optical path faced with the abnormal states; in the hardware unit of the HDT, receiving the APS cell to perform mirroring of the VCI area of the APS cell to the APS register; in the software unit of the HDT, checking whether the APS cell is an AIS or not; in the protection-switching function, receiving the APS cell of an ONU, having an abnormal optical path indicated in the VCI area of the APS cell, from the opposite direction of the optical path in the case where the APS cell is the AIS.

In addition, the protection-switching apparatus and method in the ATM system with ring topology, in the case of the APS clear cell generation situations, further includes: resetting all of the bits in the APS register; in the hardware unit of the HDT, performing mirroring of the APS register to the VCI area of the APS cell; in the hardware unit of the HDT, generating the APS clear cell; and, in the hardware unit of the HDT, transmitting the APS clear cell to the ONUs.

In addition, the step of detecting abnormal states of the optical path by the HDT includes: in the hardware unit of the HDT, detecting the optical signal of the optical path, generating an interrupt in the case where the optical signal is cut down, and informing the abnormal states of the optical path to the software unit of the HDT; and, in the software unit of the HDT, detecting the intensity of the optical signal of the optical path, and abnormal states of the optical path in the case where the intensity of the optical signal is lower than the critical value of the intensity.

In addition, the protection-switching apparatus and method in the ATM system with ring topology further includes, in the hardware unit of the HDT, performing mirroring of the APS cell to the APS register, generating an interrupt, and reporting the received data of the APS cell to the software unit of the HDT sequentially.

In addition, the step of checking whether the APS cell is the AIS or not, performed by the software unit of the HDT, includes examining, in the software unit of the HDT, the bit of the identification position of a node transmitting the APS cell among all bits of the APS register to decide whether the APS cell is the AIS or not.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
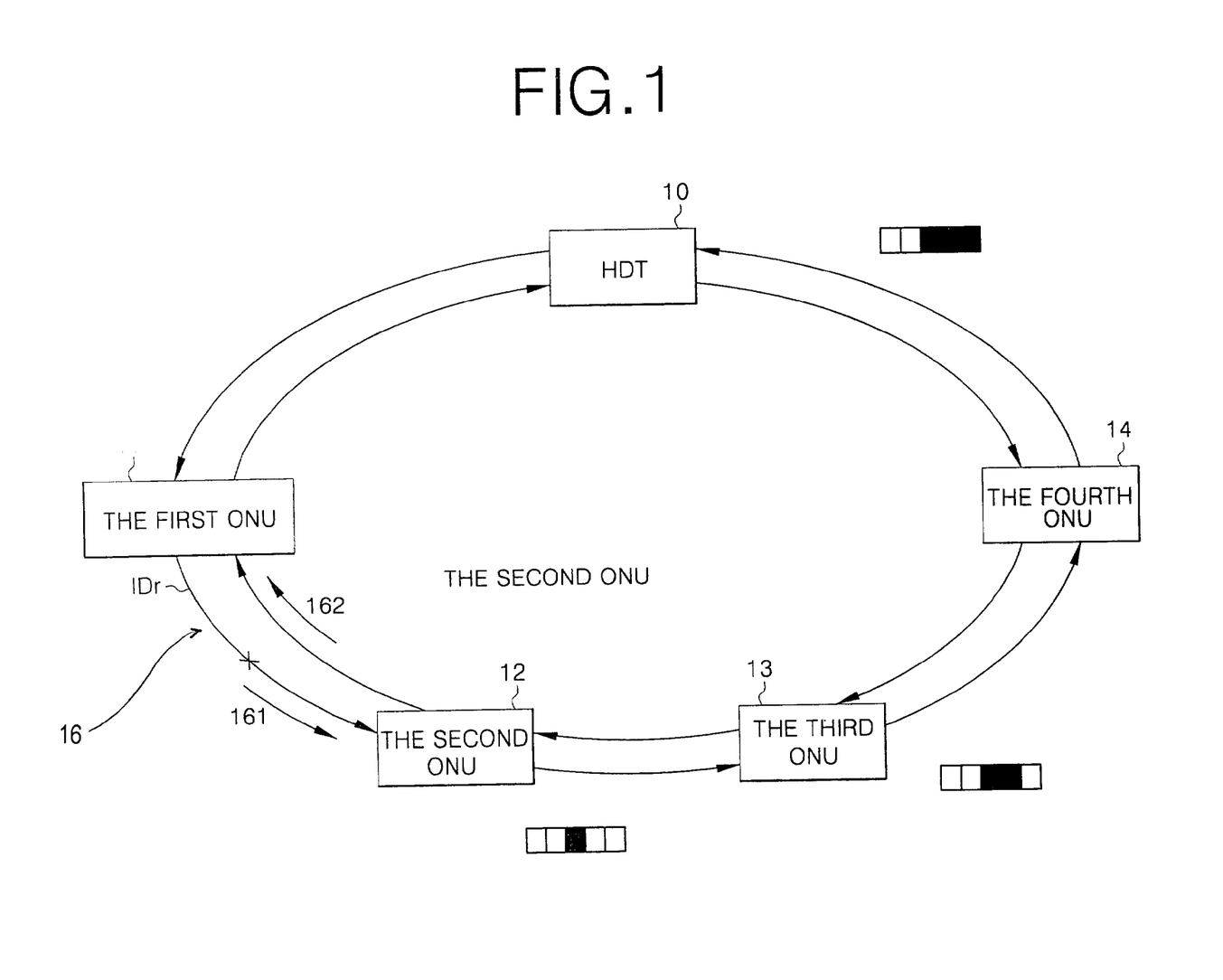
FIG. 1 is a schematic diagram of the conventional asynchronous transfer mode ATM system, Fiber Loop Carrier-C (FLC-C), with ring topology.

FIG. 1 is a schematic diagram of the conventional ATM system, the FLC-C, with ring topology. HDT 10 and four ONUs 11, 12, 13 and 14 are in a network with ring topology, and communicate through an ATM method. The FLC-C system can include one HDT and a maximum of 14 ONUs and one reserved node. For the convenience of explanation, this application illustrates an FLC-C including 4 ONUs. However, the present invention is not restricted to this case.

The HDT 10 and the ONUs 11, 12, 13, and 14 transmit an ATM cell in a first and a second direction of an optical fiber line 16 simultaneously, while receiving the ATM cell through either the first direction 161 or the second direction 162. When an arbitrary point has a trouble in an optical fiber line 16, the optical fiber line 16 having the trouble is switched, and the other optical fiber line 16 is not switched.

For example, when an optical path '1Dr' in the first direction 161 of the optical fiber line has a trouble, while the optical path '1Dr' transmits an ATM cell of a first ONU 11 to a second ONU 12, the trouble is detected by the second ONU 12. When detecting the trouble in the optical path '1Dr', the second ONU 12 performs switching function receiving the ATM cell through the second direction 162. Therefore, the second ONU 12 receives the ATM cell of the first ONU 11 from the second direction 162 passing through the HDT 10, a fourth ONU 14 and a third ONU 13.

Additionally, when the optical path '1Dr' is in trouble, the second ONU 12 has to announce the trouble to the other nodes, such as the HDT, and the third and the fourth ONUs. Therefore, the other nodes receive the ATM cell transmitted in the second direction 162 only, while receiving no ATM cell through the first direction 161.

In performing the above described operation, the second ONU 12 transmits an auto protection-switching APS cell, having a node identification data (NID) of the second ONU 12, in the first direction 161. The APS cell includes data of an optical path having no trouble. Therefore, when the other node receives the APS cell having an NID of a node through the first direction 161, the optical path is normally operated from the node to the other node through the first direction 161.

Therefore, when the second ONU 12 transmits an APS cell through the first direction 161, the third ONU 13 receives the APS cell, and performs protection-switching function according to the NID in the APS cell. In other words, the APS cell includes the NID of the second ONU 12 only. Therefore, through the first direction 161, the third ONU 13 receives an ATM cell from the second ONU 12 only. In addition, the third ONU 13 receives an ATM cell from another node, such as the HDT or the other ONUs, through the second direction 162 only.

While performing the protection-switching function, the third ONU inserts its own NID into the APS cell and transmits the APS cell in the first direction 161 to inform the fourth ONU 14. The APS cell received by the fourth ONU 14 includes the NID of the second ONU 12 and the third ONU 13. Therefore, through the first direction 161, the fourth ONU 14 receives an ATM cell from the second and the third ONUs 12, 13 only. In addition, the fourth ONU 14 receives an ATM cell from the other node, such as HDT or the other ONUs through the second direction 162.

In this way, the HDT 10 and the ONUs 12, 13, and 14 perform the protection-switching function receiving an ATM cell through the second direction 162 only, even though the ATM cell is transmitted to the first direction 161 having the troubled optical path '1Dr' at the beginning. In addition, the HDT 10 and the ONUs 11, 12, 13, and 14 do not perform the protection-switching function to an ATM cell, when the ATM cell is not transmitted through the optical path '1Dr' of the is first direction 161.

As described in the above statements, each of the HDT 10 and the ONUs 11, 12, 13, and 14 switches in protection to receive an ATM cell transmitted from the opposite direction relative to a troubled optical path. In addition, each of the HDT 10 and the ONUs 11, 12, 13, and 14 generates an APS cell with its own NID, and transmits the APS cell in the direction of the troubled optical path.

In addition, each of the HDT 10 and the ONUs 11, 12, 13, and 14 inserts its own NID into the APS cell, and transmits the APS cell continuously in the transmission direction of the APS cell. Therefore, each of the HDT 10 and the ONUs 11, 12, 13, and 14 does not perform the protection-switching function relative to an ATM cell from a node when the NID of the node is included in the APS cell. On the contrary, each of the HDT 10 and the ONUs 11, 12, 13, and 14 performs the protection-switching function relative to an ATM cell from a node when the NID of the node is not included in the APS cell to receive the ATM cell from the opposite direction of the optical fiber line.

Reference will now be made in detail to preferred embodiments of the present invention, an example of which is illustrated in the accompanying drawings.

The asynchronous transfer mode ATM system of the present invention is the same as the ATM system of FIG. 1 with, however, the differences shown below.

In an auto protection-switching APS cell, a specified generic flow control and virtual path identifier GFC/VPI are determined, and a 16-bit virtual channel identifier (VCI) designates an NID of a node.

Figure 2:
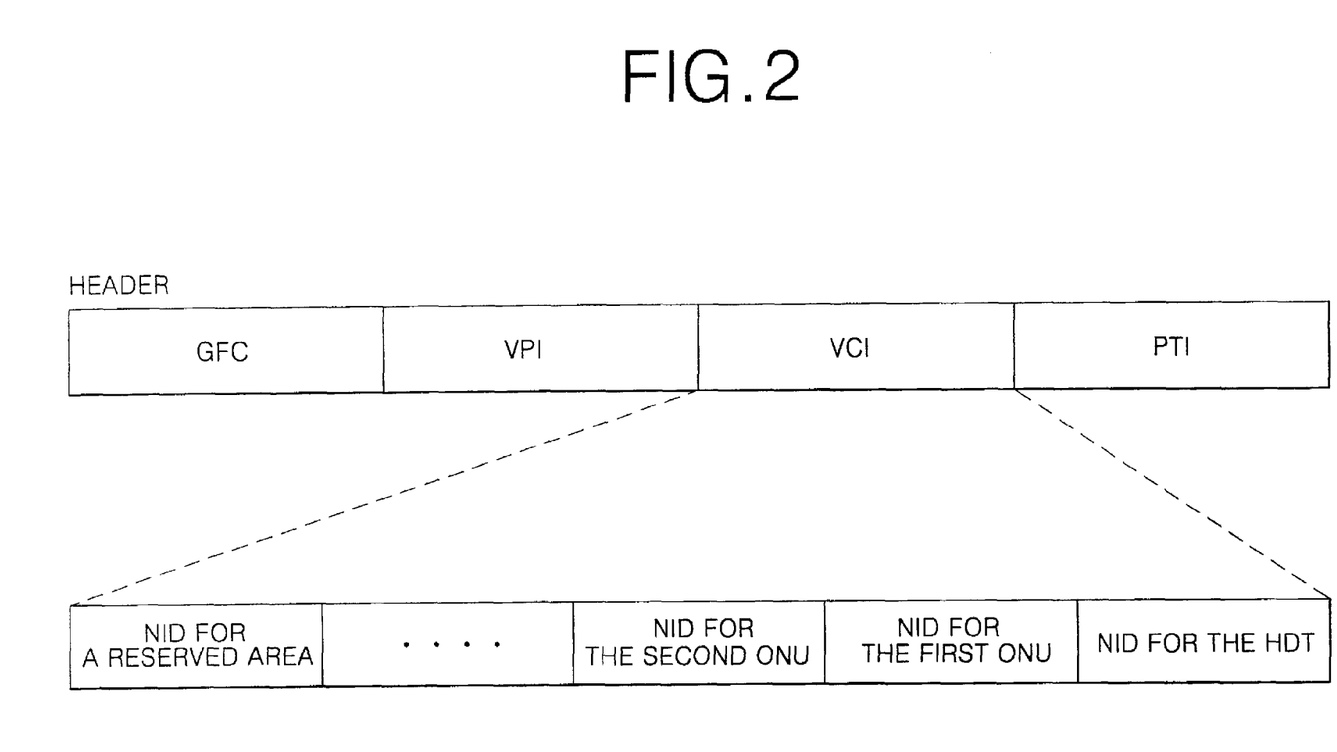
FIG. 2 is a configuration of an auto protection-switching (APS) cell.

FIG. 2 is a configuration of an APS cell. The APS cell includes an area of a GFC, a VPI, a VCI, and a payload type identifier (PTI). The GFC and the VPI area use 0*FF. Each bit in the 16-bit VCI area is inserted by an NID of a node, such as an HDT or an ONU, in a normal optical path. In other words, in the 16-bit VCI area, the lowest bit includes an NID for the HDT, and the bit in the middle includes an NID for each corresponding ONU. In addition, the highest bit of the 16-bit VCI area includes an NID for a reserved node.

Because the protection-switching method is the same among the ONUs 11, 12, 13 and 14, the second ONU 12 will be an example describing the inner structure and the protection-switching method in detail in the following statement.

When an input optical signal is cut down (signal fail), the intensity of the signal is lowered relative to the critical value (signal degrade), an operator cuts down the signal arbitrarily, and a protection-switching function is performed. In ring topology, each node can perform a switching function through the APS cell. When a trouble happens to a physical optical fiber line 16, each node generates an APS cell and transmits the APS cell to an adjacent node in each predetermined period.

In the present invention, the generation of the APS cell is performed in software, and the periodic transmission of the generated APS cell is performed in hardware. Therefore, the software process is minimized to reduce a delay time. In addition, when the APS cell is inputted from the adjacent node, each node detects, inserts, and switches in protection relative to the APS cell in software and hardware concurrently to reduce a delay time.

Figure 3A:
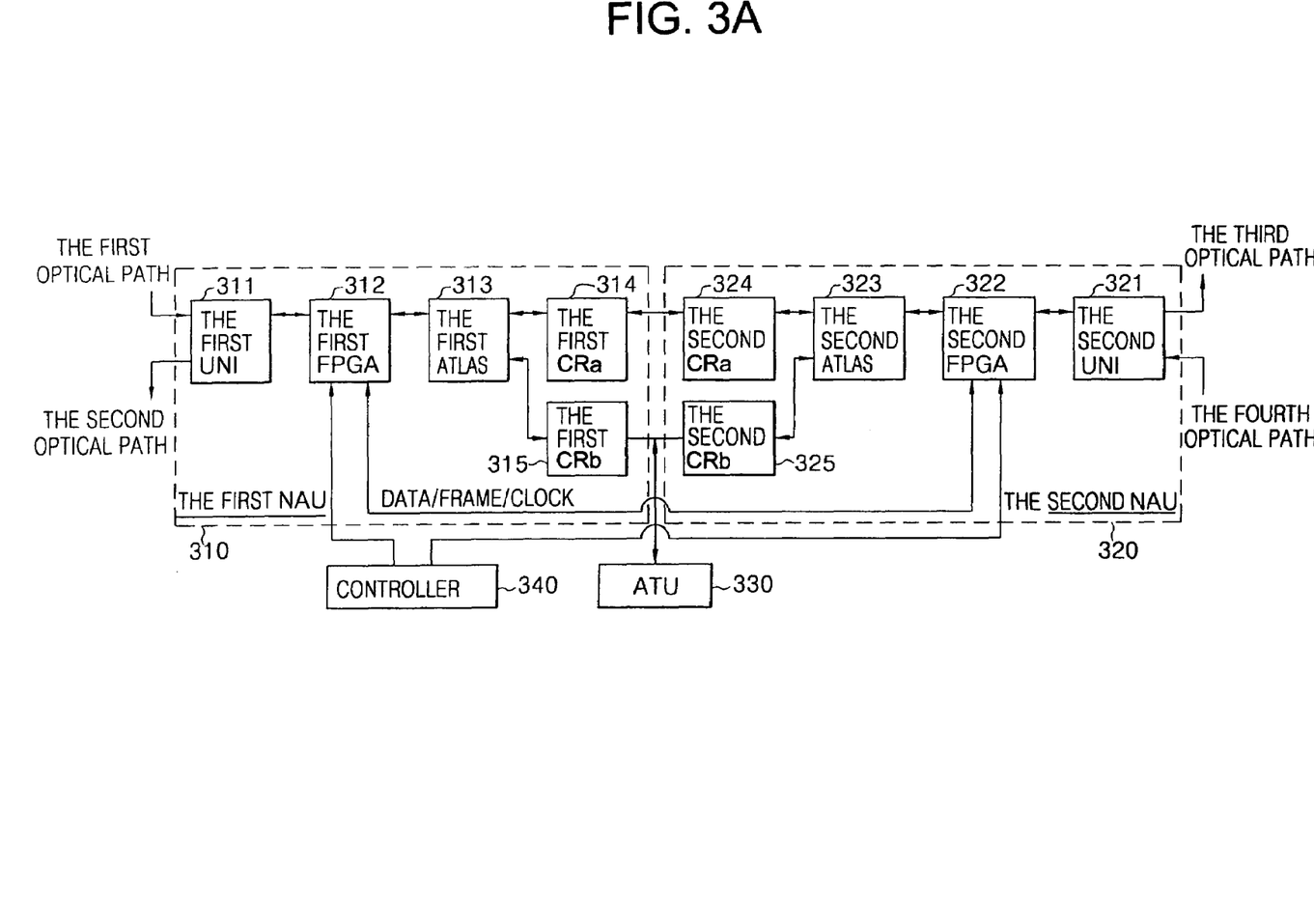
FIG. 3A is a schematic diagram of an optical network interface unit (ONIU) in a second optical network unit (ONU) according to the preferred embodiment of the present invention.
Figure 3B:
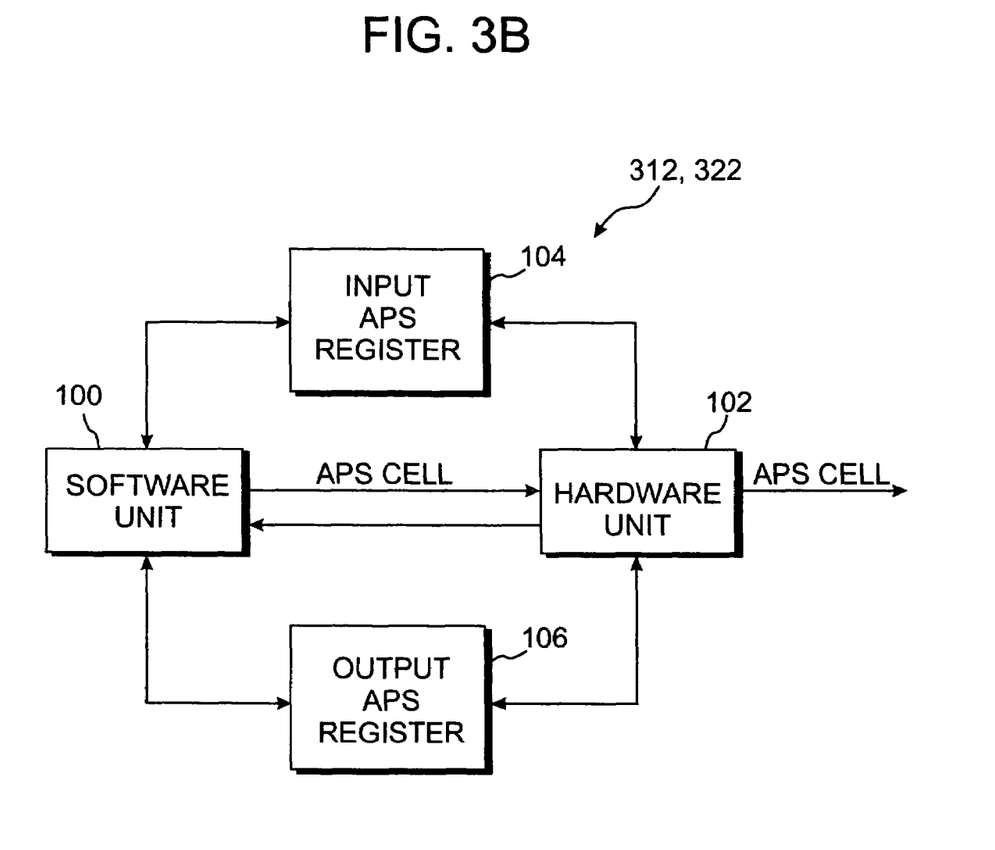
FIG. 3B is a schematic diagram of each field programmable gate array (FPGA) in the ONU of FIG. 3A.

FIG. 3A is a schematic diagram of an optical network interface unit (ONIU) in a second ONU of the present invention, and FIG. 3B is a schematic diagram of each field programmable gate array (FPGA) in the ONU of FIG. 3A. Referring to FIG. 3A, the ONIU of the second ONU includes a first network ATM unit (NAU) 310, a second NAU 320, an asymmetric digital subscriber line terminal unit (ATU) 330, and an ONU main control unit, controller, 340.

Each NAU includes a user network interface (UNI), a field programmable gate array (FPGA), an automatic testing and load analysis system (ATLAS), and two cell routers CRa and CRb.

The first UNI 311 of the first NAU 310 receives an optical signal of the first direction 161 from a first optical fiber line 16, the first optical path, and extracts an ATM cell to transmit the ATM cell to the first FPGA 312. In addition, the first UNI 311 detects states of the optical signal from the first optical path to transmit the states of the optical signal to the first FPGA 312. In addition, the first UNI 311 converts the ATM cell transmitted from the first FPGA 312 to an optical signal, and transmits the optical signal to the second direction 162 of the optical fiber line 16 through the second optical path.

Referring to FIG. 3B, the first FPGA 312 includes a software unit 100 and a hardware unit 102. The first FPGA 312 reports a trouble of an optical path detected by the first UNI 311 to the controller 340. Sequentially, the first FPGA 312 generates an APS cell inserted by its own NID, and transmits the APS cell to a third optical path through the second NAU 320. Additionally, following the protection-switching order of the controller 340, the first FPGA 312 transmits an ATM cell from the first UNI 311 to the ATU 330 through the first ATLAS 313 and the first CRb 315, or discards the ATM cell.

In addition, when an APS cell is inputted from the second NAU 320, the first FPGA 312 transmits the APS cell to the second optical path through the first UNI 311. Additionally, when an APS cell is inputted through the first UNI 311, the first FPGA 312 transmits the APS cell to the controller 340. After inserting its own NID to the APS cell in addition, the first FPGA 312 transmits the APS cell to the third optical path through the second NAU 320. The operation of the first FPGA 312 is later described in more detail in this application.

The first ATLAS 313, managing an operation, administration, and maintenance (OAM) of the network, receives an ATM cell dropped into the corresponding node through the first FPGA 312, and transmits the ATM cell to the ATU 330 through the first CRb 315. In addition, the first ATLAS 313 receives an ATM cell added in the corresponding node through the ATU 330 and the first CRb 315, and transmits the ATM cell to the first FPGA 312. In this case, the ATM cell added in the corresponding node, is inputted to the first CRb 315 and the second CRb 325 simultaneously. Therefore, the ATM cell is transmitted in both directions concurrently.

The first CRa 314 performs a cell routing function by transmitting an ATM cell passing through the corresponding node to the second NAU 320 and the second CRa 324. Similarly, the second CRb 315 performs a cell routing function by receiving an ATM cell added to the corresponding node through the ATU 330, and by transmitting an ATM cell dropped in the corresponding node to the ATU 330.

The ATU 330 receives an ATM cell transmitted from the network to the subscriber through the first CRb 315 and the second CRb 325. The received ATM cell is transmitted to the numerous ADSL modems by using a level two in a universal test & operation PHY (physical or physical layer protocol) interface for ATM (UTOPIA). Sequentially, in order to transmit data in high speed by using a telephone line, the ADSL modem modulates the corresponding ATM cell to provide an analog signal, and transmits the ATM cell to a subscriber. On the contrary, after demodulating an analog signal from a subscriber to a digital signal, the ATM cell is transmitted to a first CRb 315 and the second CRb 325 by using the level two in UTOPIA.

Additionally, the second UNI 321 of the second NAU 320 receives an optical signal from the fourth optical path, extracts an ATM cell from the optical signal, and transmits the ATM cell to the second FPGA 322. As a result, the ATM cell is transmitted to the second direction 162 of the optical fiber line. In addition, the second UNI 321 detects the states of the optical signal, and reports the states of the optical signal to the second FPGA 322. In addition, the second UNI 321 converts an ATM cell from the second FPGA 322 to an optical signal, and transmits the optical signal in the first direction 161 of the optical fiber line 16 through the third optical path.

The second FPGA 322 includes a software unit 100 (FIG. 3B) and a hardware unit 102. When detecting a trouble in an optical fiber line, the second FPGA 322 reports the trouble to the controller 340, and generates an APS cell inserted by its own NID so as to transmit the APS cell to the second optical path through the first NAU 310. In addition, following the protection-switching order from the controller 340, the second FPGA 322 transmits an ATM cell of the second UNI 321 to the ATU 330 through the second ATLAS 323 and the second CRb 325, or discards the ATM cell. In addition, when the APS cell is inputted from the first NAU 310, the second FPGA 322 transmits the APS cell to the third optical path through the second UNI 321. Additionally, when an APS cell is inputted through the second UNI 321, the second FPGA 322 transmits the APS cell to the controller 340, and inserts its own NID into the APS cell in addition so as to transmit the APS cell to the second optical path through the first NAU 310. The operation of the second FPGA 322 is described later in more detail in this application.

The second ATLAS 323 managing OAM of the network receives an ATM cell dropped into the corresponding node through the second FPGA 322, and transmits the ATM cell to the ATU 330 through the second CRb 325. In addition, the second ATLAS 323 receives an ATM cell added from the corresponding node through the ATU 330 and the second CRb 325, and transmits the ATM cell to the second FPGA 322. The second CRa 324 performs a cell routing function by transmitting an ATM cell passing through the corresponding node to the first CRa 314 of the first NAU 310. In addition, the second CRb performs a cell routing function by transmitting an ATM cell dropped into the corresponding node to the ATU 330, and by receiving an ATM cell added from the corresponding node from the ATU 330.

The controller 340 not only controls the first NAU 310 and the second NAU 320 entirely, but also performs a protection-switching function, according to the trouble data and an APS cell of the first FPGA 312 and the second FPGA 322. Additionally, because the first FPGA 312 and the second FPGA 322 are directly connected to the controller 340, an APS cell frame and clock data are directly transmitted from/to (from or to or both from and to) the controller 340.

Now, the operation of generating, detecting, and inserting an APS cell in the first FPGA 312 and the second FPGA 322 in the second ONU 12, and the protection-switching operation of the controller 340 in the second ONU 12, will be explained by referring to the flow charts from FIG. 4 to FIG. 6.

Figure 4:
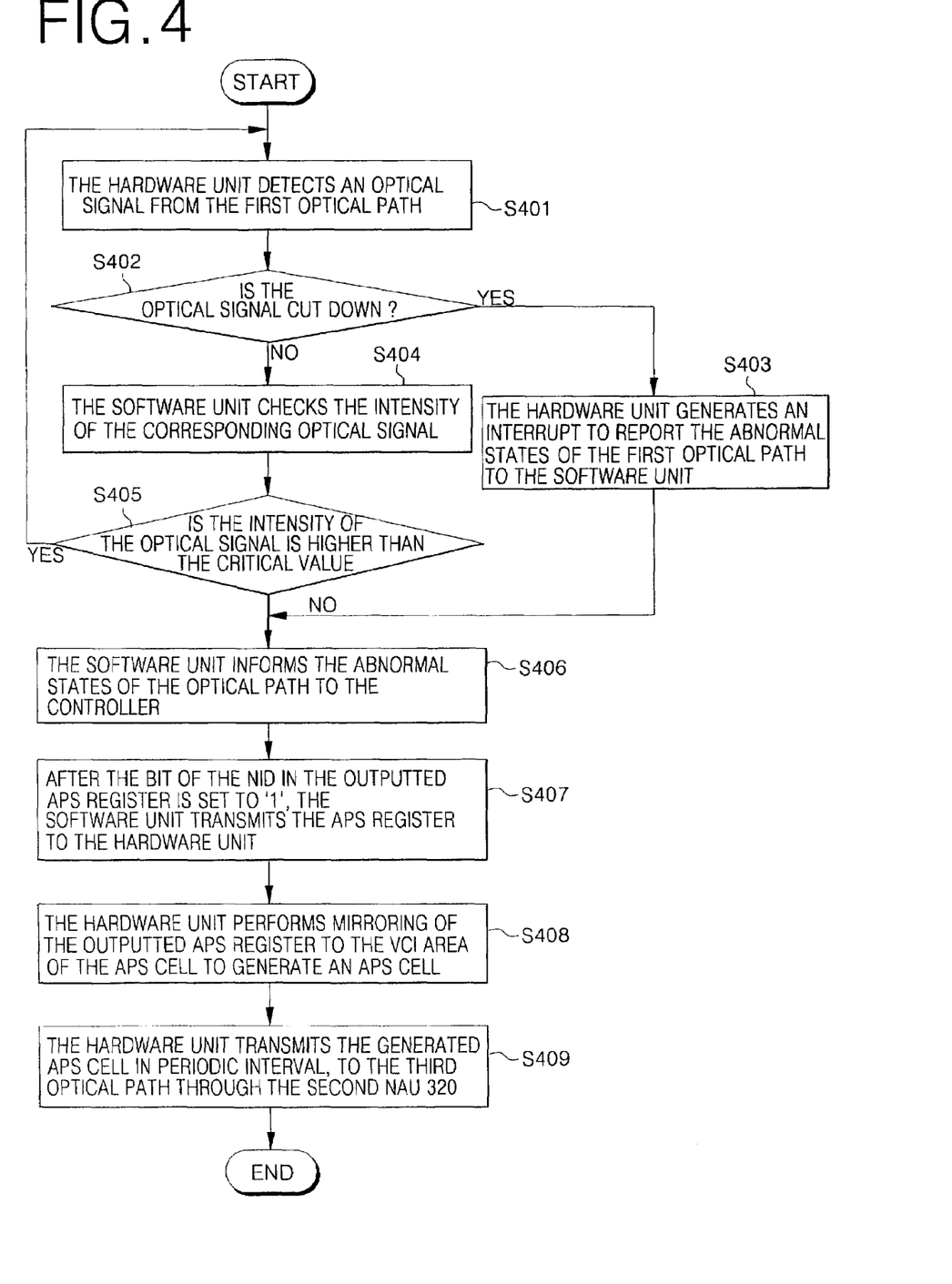
FIG. 4 is a flow chart illustrating the APS cell generation procedure in a first field programmable gate array (FPGA) of the second ONU according to the present invention.

FIG. 4 is a flow chart illustrating the APS cell generation procedure in the first FPGA 312 of the second ONU 12 of the present invention.

The hardware unit 102 (FIG. 3B) of the first FPGA 312 detects an optical signal received from the first optical path (step S401). When the optical signal is cut down by the disconnection of the first optical path or for other reasons (step S402), abnormal states have been generated. Therefore, the hardware unit 102 generates an interrupt to report the abnormal states of the first optical path to the software unit 100 (step S403), and step S406 proceeds.

However, when the optical signal is not cut down (step S402), the software unit 100 of the first FPGA 312 checks the intensity of the corresponding optical signal (step S404). As a result, according to the trouble of the first optical path, when the intensity of the corresponding optical signal is lower than the critical value (step S405), the first optical path has a trouble. Therefore, step S406 proceeds. However, when the intensity of the optical signal is higher than the critical value (step S405), the first optical path is in a normal state. Therefore, step S401 proceeds and waits for the next optical signal.

When the first optical path is in trouble, the software unit 100 reports the abnormal states to the controller so that the controller performs the protection-switching function (step S406). In addition, after the bit of the NID in the output APS register 106 is set to '1', the APS register contents are transmitted to the hardware unit 102 (step S407). The hardware unit 102 performs mirroring of the output APS register 106 to the VCI area of the APS cell so as to generate an APS cell (step S408), and transmits the generated APS cell in a periodic interval, such as 1, 2, 5, 10, or 20 mSec (millisecond), to the third optical path through the second NAU 320 (step S409). When a message of "completion of protection-switching operation in all of the nodes" is inputted, the hardware unit 102 does not transmit the APS cell any more.

Figure 5:
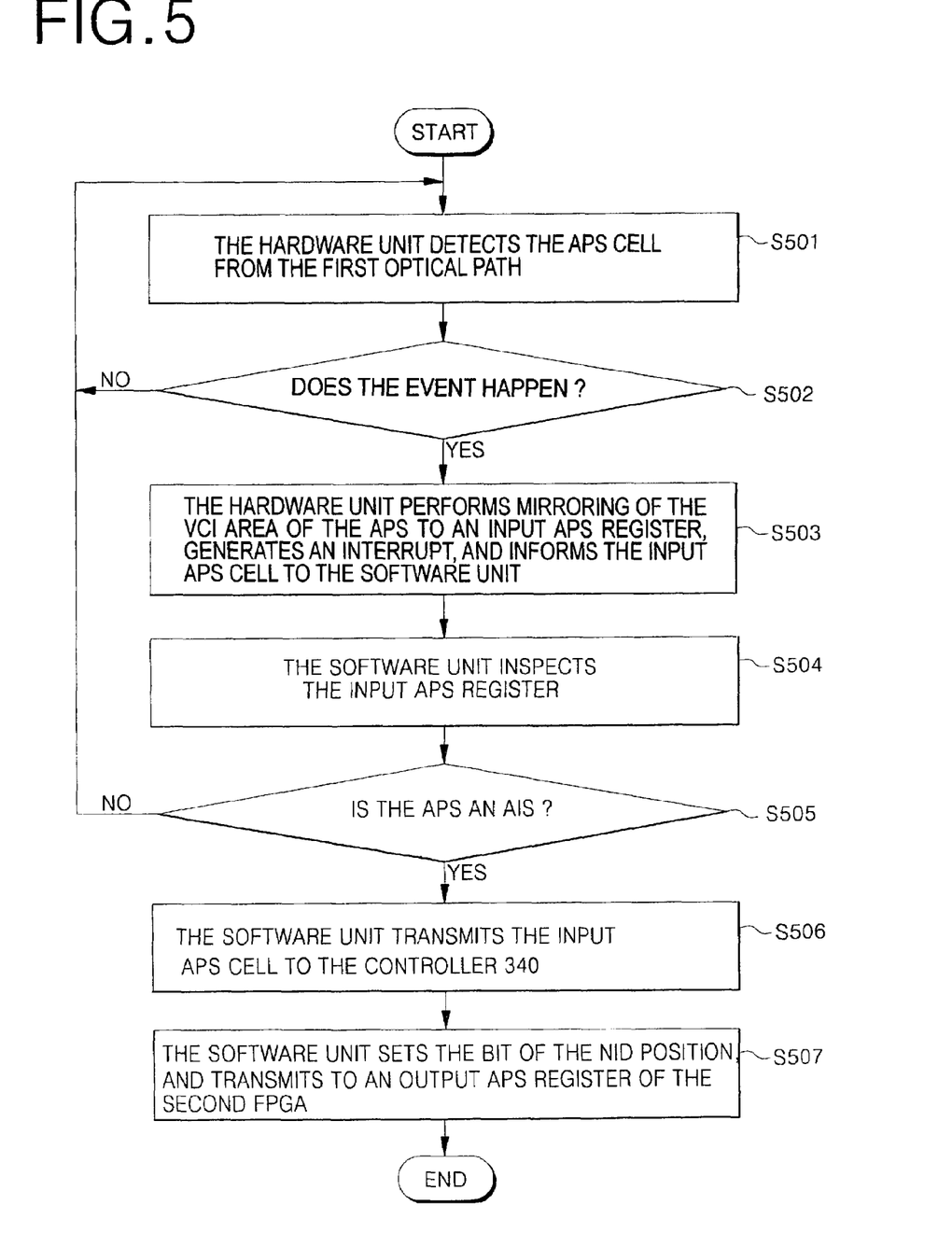
FIG. 5 is a flow chart illustrating a detection and insertion procedure for the APS cell in the first FPGA of the second ONU according to the present invention.

FIG. 5 is a flow chart illustrating a detection and insertion procedure for the APS cell in the first FPGA of the second ONU according to the present invention.

The hardware unit 102 (FIG. 3B) of the first FPGA 312 detects the APS cell from the first optical path (step S501). When the event happens (step S502), the VCI area of the APS cell is mirrored to an input APS register 104, an interrupt is generated, and the input APS cell is reported to the software unit 100 (step S503). Sequentially, the software unit 100 inspects the input APS register 104 (step S504) and reviews whether the corresponding APS cell is an alarm indication signal AIS or not (step S505). At this point, all bits of the input APS register 104 are not examined. Instead, an identifier position of a node connected to the first optical path is examined. In other words, in the case of the second ONU 12, because the first optical path is connected to the first ONU 11, the position of '1h' is examined. When the corresponding bit is set, the APS cell is considered as an AIS signal.

When the APS cell is an AIS signal (step S505), the software unit 100 transmits the input APS cell to the controller 340 (step S506). In addition, after setting the bit of the NID position, the APS cell is transmitted to an output APS register 106 of the second FPGA 322 (step S507).

The software unit 100 of the second FPGA 322 performs mirroring of the contents of the output APS register 106 to the VCI area of the APS cell transmitted to the second UNI 321. Conversely, when an APS cell is generated in the second direction 162 and data of an input APS register 104 of the second FPGA 322 is transmitted to an output APS register 106 of the first FPGA 312, the software unit 100 of the first FPGA 312 performs mirroring of the contents of the output APS register 106 to the VCI area of the APS cell transmitted to the first UNI 311. When the APS cell is not an AIS signal (step S505), step S501 is then repeated.

Figure 6:
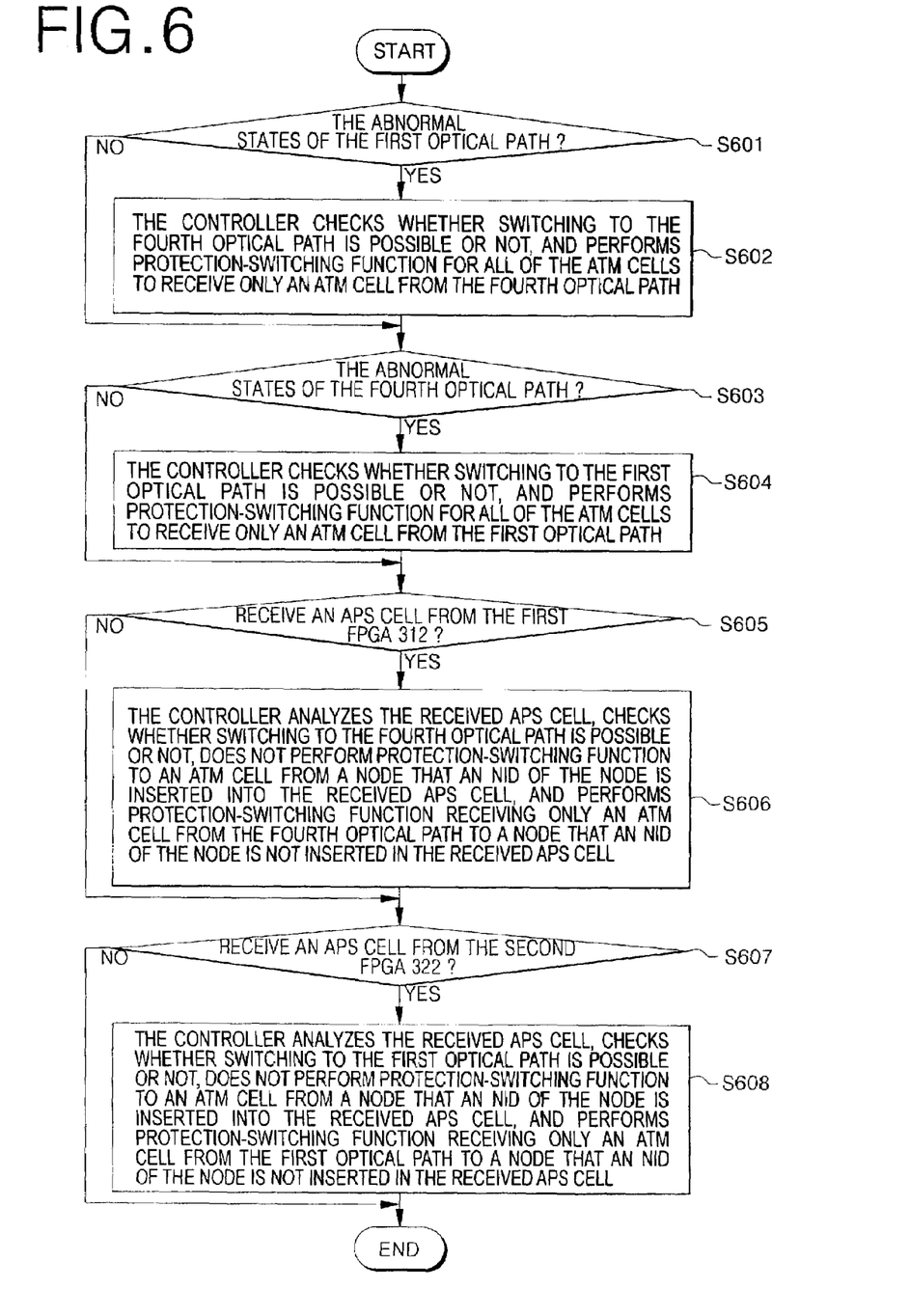
FIG. 6 is a flow chart illustrating a protection-switching procedure in a controller of the second ONU according to the present invention.

FIG. 6 is a flow chart illustrating a protection-switching procedure in a controller 340 of the second ONU 12 according to the present invention.

When the first FPGA 312 reports the abnormal states of the first optical path (step S601), the controller 340 checks whether switching to the fourth optical path is possible or not, and performs the protection-switching function for all of the ATM cells so as to receive only an ATM cell from the fourth optical path (step S602).

When the abnormal states in the first optical path are not detected in step S601, or the protection-switching function is completed in step S602, the controller 340 performs step S603. When the second FPGA 322 reports the abnormal states of the fourth optical path (step S603), the controller 340 checks whether switching to the first optical path is possible or not, and performs the protection-switching function for all of the ATM cells so as to receive only an ATM cell from the first optical path (step S604).

When the abnormal states in the fourth optical path are not detected in step S603, or the protection-switching function is completed in the S604, the controller 340 performs step S605. When receiving an APS cell from the first FPGA 312 through the first optical path (step S605), the controller 340 analyzes the received APS cell, checks whether switching to the fourth optical path is possible or not, does not perform the protection-switching function relative to an ATM cell from a node, an NID of which is inserted into the received APS cell, and performs the protection-switching function by receiving only an ATM cell from the fourth optical path to a node, an NID of which is not inserted into the received APS cell (step S606).

When an APS cell is not transmitted from the first FPGA 312 in step S605, or the protection-switching function is completed in step S606, the controller 340 performs step S607. When receiving an APS cell from the second FPGA 322 through the second optical path (step S607), the controller 340 analyzes the received APS cell, checks whether switching to the first optical path is possible or not, does not perform the protection-switching function relative to an ATM cell from a node, an NID of which is inserted into the received APS cell, and performs the protection-switching function by receiving only an ATM cell from the first optical path to a node, an NID of which is not inserted into the received APS cell (step S608).

From now on, the operation of protection-switching in the HDT 10 is illustrated. The HDT 10, differing from the ONU, is a node terminating the APS cell and generating an APS clear cell. However, the HDT 10 also generates an APS cell, wherein a software unit generates an APS cell and a hardware unit donates the generated APS cell in periodic interval, such as 10, 20, or 100 mSec.

Figure 7A:
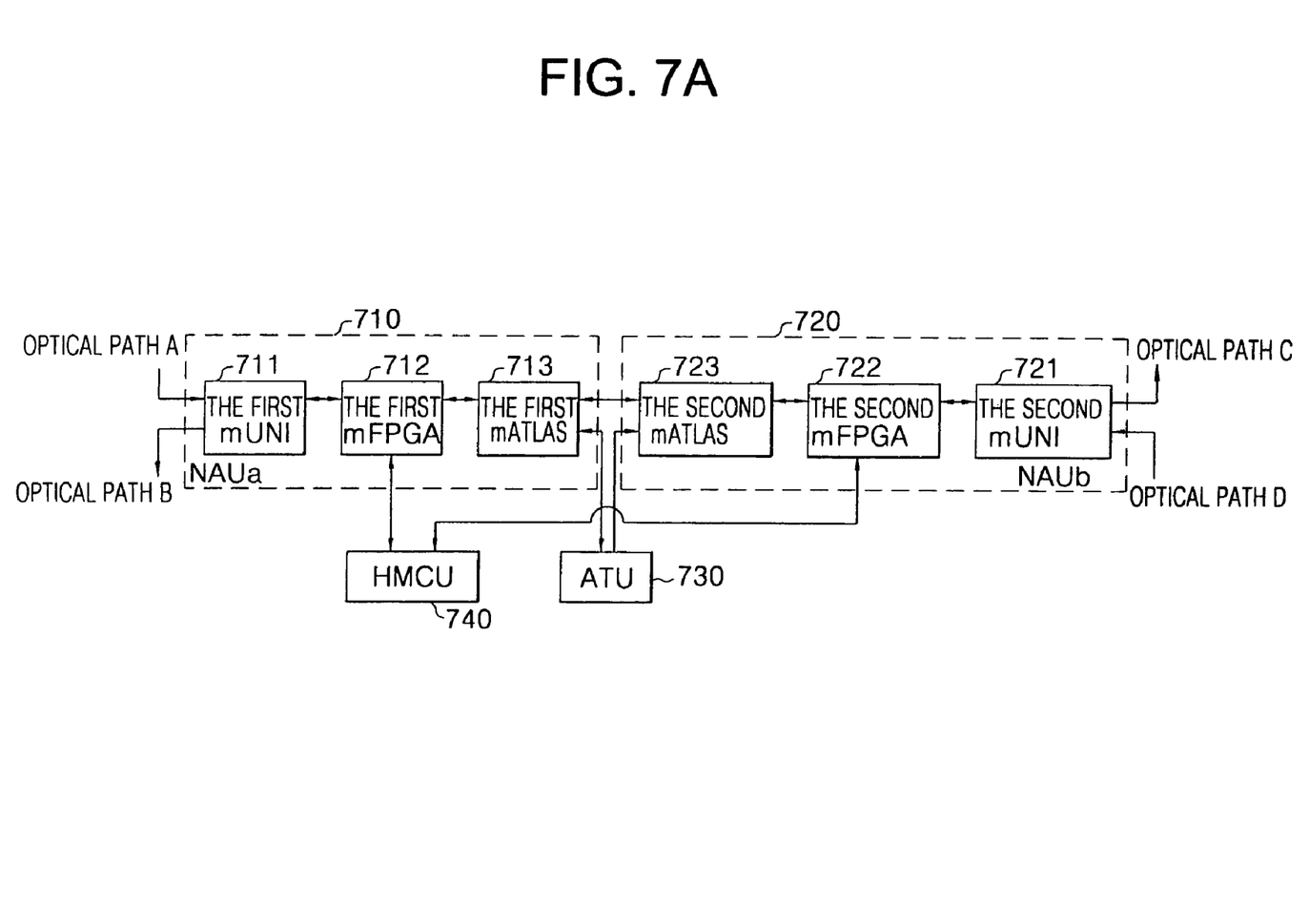
FIG. 7A is a schematic diagram of an ONIU in a host digital terminal (HDT) according to the present invention.
Figure 7B:
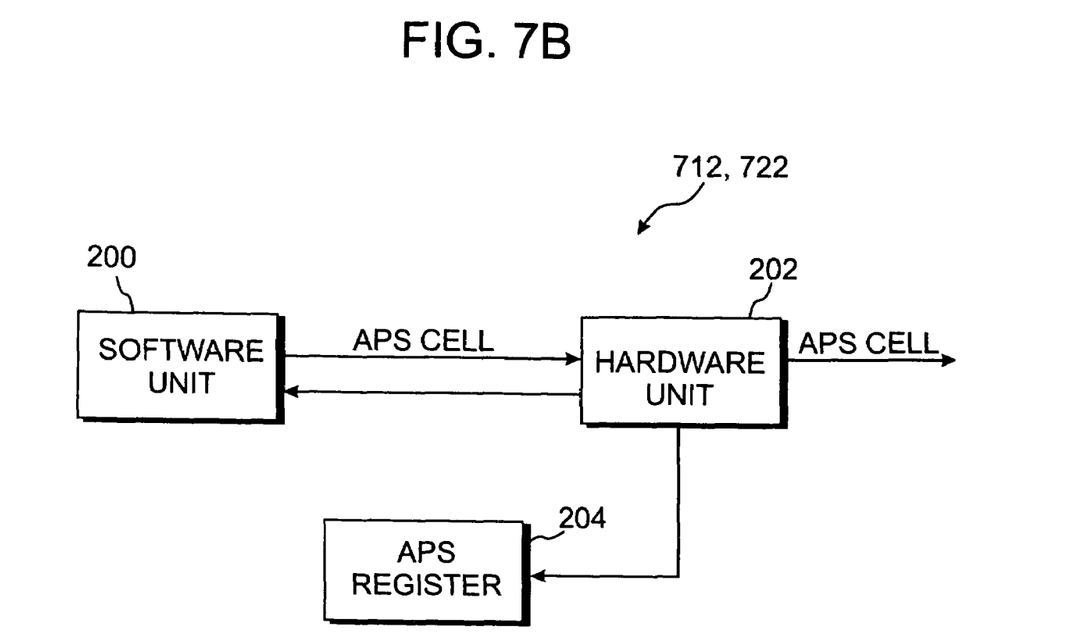
FIG. 7B is a schematic diagram of each field programmable gate array (FPGA) in the ONIU of FIG. 7A.

FIG. 7A is a schematic diagram of an ONIU in the HDT 10 according to the present invention, and FIG. 7B is a schematic diagram of each field programmable gate array (FPGA) in the ONIU of FIG. 7A. Even though the ATM FLC-C system with ring topology of FIG. 1 has one HDT with one ring, the ONIU of one HDT can be connected with multiple rings including numerous ONUs.

The ONIU of the HDT includes NAUa 710, NAUb 720, ATU 730, and an HDT main control unit HMCU 740 in large. The NAUa 710 includes a first mUNI 711, a first mFPGA 712, and a first mATLAS 713, and the NAUb 720 includes a second mUNI 721, a second mFPGA 722, and a second mATLAS 723.

The first mUNI 711 of the NAUa 710 receives an optical signal of the first direction 161 from the optical path 'A', extracts an ATM cell from the optical signal, and transmits the ATM cell to the first mFPGA 712. In addition, the first mUNI 711 detects the states of the optical path 'A', and reports the data of the states to the first mFPGA 712. In addition, the first mUNI 711 converts an ATM cell of the first mFPGA 712 to an optical signal, and transmits the optical signal to the second direction 162 through the optical path 'B'.

The first mFPGA 712 includes a software unit 200 and a hardware unit 202. The first mFPGA 712 provides the HMCU 740 with abnormal states data of the optical path 'A' detected by the first mUNI 711. In addition, following the protection-switching order of the HMCU 740, the first mFPGA 712 transmits an ATM cell of the first mUNI 711 to the ATU 730 through the first mATLAS 713, or discards the ATM cell. When the first mUNI 711 transmits an APS cell, the first mFPGA 712 stores the APS cell and transmits the APS cell to the HMCU 740. Because the HDT 10 is a node terminating the APS cell, the first mFPGA 712 does not transmit the corresponding APS cell to NAUb 720.

The second mUNI 721 of the NAUb 720 receives an optical signal of the second direction 162 from the optical path 'D', extracts an ATM cell from the optical signal, and transmits the ATM cell to the second mFPGA 722. In addition, the second mUNI 721 detects the states of the optical path 'D', and informs the data of the states to the second mFPGA 722. In addition, the second mUNI 721 converts an ATM cell of the second mFPGA 722 to an optical signal, and transmits the optical signal in the first direction 161 through the optical path 'C'.

The second mFPGA 722 includes a software unit 200 and a hardware unit 202. The second mFPGA 722 provides the HMCU 740 with abnormal states data of the optical path 'D' detected by the second mUNI 721. In addition, following the protection-switching order of the HMCU 740, the second mFPGA 722 transmits an ATM cell of the second mUNI 721 to the ATU 730 through the second mATLAS 723, or discards the ATM cell. When the second mUNI 721 transmits an APS cell, the second mFPGA 722 stores the APS cell and transmits the APS cell to the HMCU 740. Because the HDT 10 is a node terminating the APS cell, the second mFPGA 722 does not transmit the corresponding APS cell to NAUa 710.

The operation of the first mATLAS 713, the second mATLAS 723, and the ATU 530 are similar to the operation of the first ATLAS, the second ATLAS, and the ATU in an ONIU of an ONU. Therefore, a detailed explanation will be omitted herein.

The HMCU 740 performs the protection-switching function by using state data of the optical path from the first and the second mFPGA 712 and 722, or by using an APS cell from the first and the second mFPGA 712 and 722. The protection-switching procedure of the HMCU 740 of the HDT 10 is the same as that of a controller of an ONU. In other words, when the optical path 'A' has trouble, the protection-switching function is performed to receive an ATM cell from the optical path 'D' only. In the same way, when the optical path 'D' has trouble, the protection-switching function is performed to receive an ATM cell from the optical path 'A' only. In addition, when receiving an APS cell from the first and the second mFPGA 712 and 722, the HMCU 740 does not perform the protection-switching function with respect to an ONU when an NID of the ONU is inserted into the APS cell, and performs the protection-switching function to an ONU when an NID of the ONU is not inserted to the APS cell.

The operation of the first mFPGA 712 is illustrated in the following statements.

When an optical signal from the optical path 'A' is interrupted, in other words, the optical path 'A' is in the abnormal states, the hardware unit 202 of the first mFPGA 712 detects the abnormal states, generates an interrupt, and reports the abnormal states to the software unit 200. Additionally, when the intensity of the optical signal from the optical path 'A' is lower than the critical value, the software unit 200 of the first mFPGA 712 also detects the trouble of the optical path 'A'. When the optical path 'A' is in trouble, the software unit 200 of the first mFPGA 712 reports the trouble of the optical path 'A' to the HMCU 740, and the HMCU 740 performs the protection-switching function.

When the hardware unit 202 of the first mFPGA 712 receives an APS cell and performs mirroring of the VCI area of the APS cell to an APS register 204, the software unit 200 of the first mFPGA 712 checks the position storing an NID of an ONU transmitting the APS cell. When the bit of the corresponding position is set, the first mFPGA 712 transmits the APS cell to the HMCU 740, and the HMCU 740 performs the protection-switching function.

The operation of the second mFPGA 722 is illustrated in the following statements.

When an optical signal from the optical path 'D' is interrupted, in other words, the optical path 'D' is in the abnormal states, the hardware unit 202 of the second mFPGA 722 detects the abnormal states, generates an interrupt, and reports the abnormal states to the software unit 200. Additionally, when the intensity of the optical signal from the optical path 'D' is lower than the critical value, the software unit 200 of the second mFPGA 722 also detects the trouble of the optical path 'D'. When the optical path 'D' is in trouble, the software unit 200 of the second mFPGA 722 reports the trouble of the optical path 'D' to the HMCU 740, and the HMCU 740 performs the protection-switching function.

When the hardware unit 202 of the second mFPGA 722 receives an APS cell and performs mirroring of the VCI area of the APS cell to an APS register 204, the software unit 200 of the first mFPGA 712 checks the position storing an NID of an ONU transmitting the APS cell. When the bit of the corresponding position is set, the second mFPGA 722 transmits the APS cell to the HMCU 740.

Figure 8:
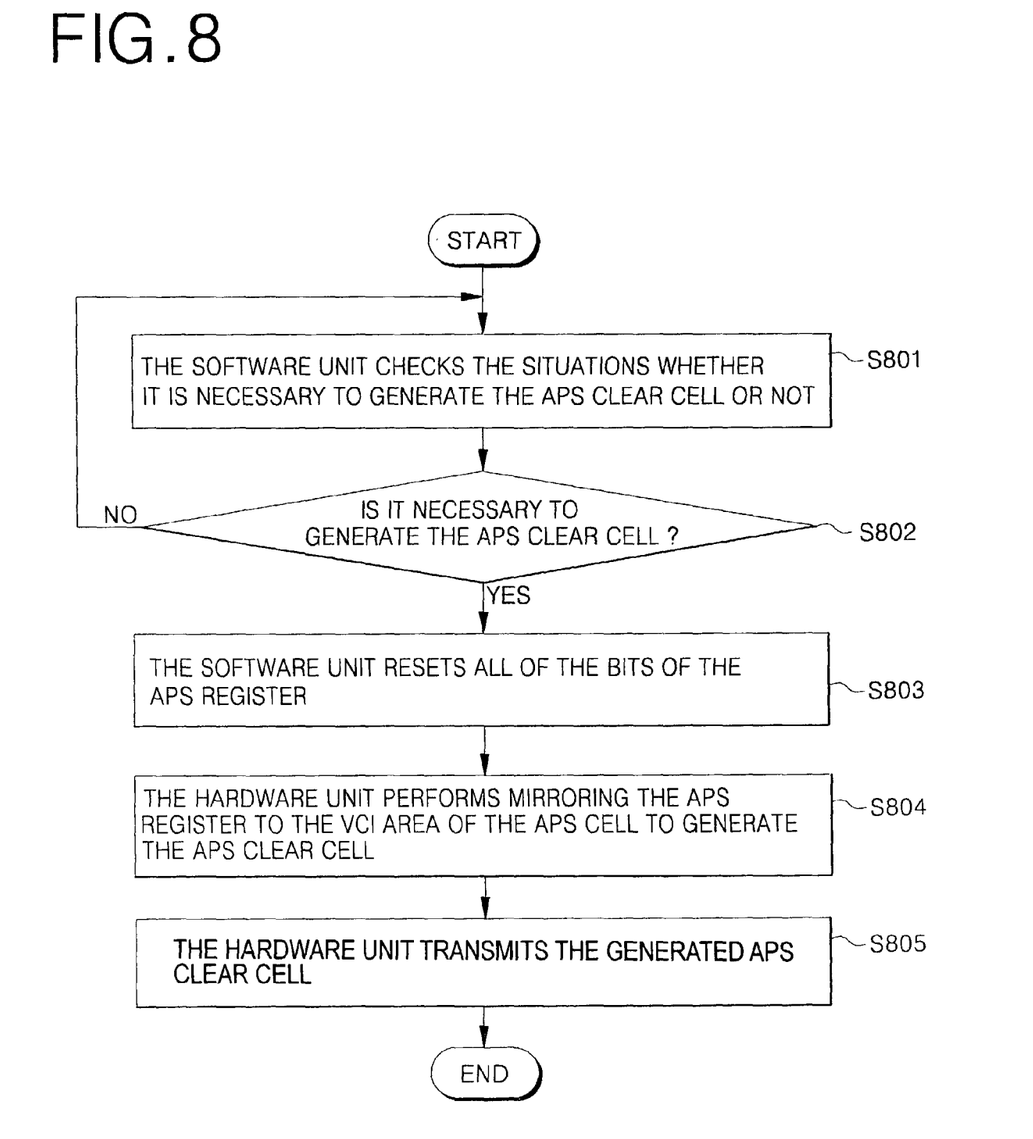
FIG. 8 is a flow chart illustrating an APS clear cell generation procedure in a field programmable gate array (FPGA) of the HDT according to the present invention.

When the power is reset or the switching procedure is ended, the HDT 10 generates an APS clear cell, and transmits the APS clear cell to ONUs. FIG. 8 is a flow chart illustrating an APS clear cell generation procedure in a mFPGA of the HDT according to the present invention. The mFPGA is a common designation of the first and the second mFPGA 712 and 722 in FIG. 7.

At first, the software unit 200 (FIG. 7B) of the mFPGA checks whether it is necessary to generate the APS clear cell or not (step S801). When the situation is such that the APS clear cell is generated (step S802), for example, the power is reset or the switching procedure is ended, the software unit 200 of mFPGA resets all of the bits in the APS register (step S803). Sequentially, the hardware unit 202 of mFPGA performs mirroring of the APS register 204 to the VCI area of the APS cell so as to generate the APS clear cell (step S804), and the generated APS clear cell is transmitted to the ONU (step S805). If it is not necessary to generate the APS clear cell (step S802), then step S801 is repeated.

As described in the above statements, the ATM system with ring topology of the present invention performs a protection-switching operation by referring the data inserted in the APS cell only. Therefore, the burden of performing the protection-switching operation can be reduced. In addition, because the generation, detection and insertion operation in the APS cell is performed in both a software and a hardware manner, delay time for the protection-switching operation can be reduced. As a result, the ATM system with ring topology of the present invention reduces the switching delay time which can be generated in the protection-switching operation, and reduces the burden of the protection-switching operation.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A protection-switching apparatus in an asynchronous transfer mode system with ring topology, comprising:

an optical network unit for detecting trouble and abnormal states of an optical path connected to the optical network unit itself, the asynchronous transfer mode system using an auto protection switching cell, with a virtual channel identifier field, to store data of an optical path having abnormal or normal states when the asynchronous transfer mode system, transmitting an asynchronous transfer mode cell simultaneously in two directions, is in a ring shape with a host digital terminal and a plurality of optical network units, each of the optical network units comprising:

a hardware unit;

a software unit, the hardware unit and the software unit in combination generating and transmitting the auto protection switching cell; and an auto protection switching register, to which copying of the virtual channel identifier field of the auto protection switching cell is performed by the hardware unit, and from which the virtual channel identifier field is read and set by the software unit;

wherein the optical network unit performs a protection-switching function by receiving the asynchronous transfer mode cell from a first direction opposite to a second direction of the optical path having the trouble;

said software unit of the optical network unit inserting node identification data of the optical network unit into the auto protection switching register of the optical path of normal states; and said hardware unit and said software unit of the optical network unit in combination generating the auto protection switching cell by performing copying of contents of the auto protection switching register to the virtual channel identifier field of the auto protection switching cell, and transmitting the auto protection switching cell in a direction the same as a direction of an optical path having the abnormal states.

2. The apparatus of claim 1, wherein the hardware unit of the optical network unit detects an optical signal of the optical path, generates an interrupt when the optical signal is cut down, and reports the abnormal states of the optical path to the software unit of the optical network unit; and wherein the software unit of the optical network unit detects an intensity of the optical signal of the optical path and abnormal states of the optical path in a case wherein the intensity of the optical signal is lower than a critical value of the intensity.

3. The apparatus of claim 1, wherein the hardware unit of the optical network unit transmits the auto protection switching cell in a periodic interval until a message of protection-switching completion is inputted from the host digital terminal and other optical network units.

4. A protection-switching apparatus in an asynchronous transfer mode system with ring topology, using an auto protection switching cell with a virtual channel identifier field to store data of an optical path having abnormal or normal states, in the case wherein the asynchronous transfer mode system transmitting an asynchronous transfer mode cell simultaneously in two directions is in a ring shape with a host digital terminal and optical network units, each of the optical network units comprising:

a hardware unit;

a software unit, the hardware unit and the software unit in combination generating the auto protection switching cell; and an auto protection switching register, to which copying of the virtual channel identifier field of the auto protection switching cell is performed by the hardware unit, and from which the virtual channel identifier field is read and set by the software unit;

wherein the hardware unit of the optical network unit receives the auto protection switching cell so as to perform copying of a virtual channel identifier field of the auto protection switching cell to the auto protection switching register;

wherein the software unit of the optical network unit determines whether the auto protection switching cell is an alarm indication signal;

said apparatus further comprising means for performing a protection-switching function to receive the auto protection switching cell of an optical network unit, including an abnormal optical path indicated in the virtual channel identifier area of the auto protection switching cell, from a direction opposite to a direction of the abnormal optical path when the auto protection switching cell is the alarm indication signal;

wherein the software unit of the optical network unit inserts node identification data of the optical network unit into the optical path, including contents of the auto protection switching register of normal states, when the auto protection switching cell is the alarm indication signal; and wherein the hardware unit of the optical network unit copies contents of the auto protection switching register to the virtual channel identifier field of the auto protection switching cell so as to generate the auto protection switching cell again, and to transmit the auto protection switching cell in the direction of the optical path having the abnormal states.

5. The apparatus of claim 4, wherein the hardware unit of the optical network unit mirrors the auto protection switching cell to the auto protection switching register, generates an interrupt, and reports the received data of the auto protection switching cell to the software unit of the optical network unit sequentially.

6. The apparatus of claim 4, wherein the software unit of the optical network unit examines a bit of an identification position of a node transmitting the auto protection switching cell, among all bits of the auto protection switching register, so as to decide whether the auto protection switching cell is the alarm indication signal.

7. A protection-switching apparatus in an asynchronous transfer mode system with ring topology, using an auto protection switching cell with a virtual channel identifier field to store data of an optical path having abnormal or normal states, when the asynchronous transfer mode system transmitting an asynchronous transfer mode cell simultaneously in two directions is in a ring shape with a host digital terminal and numerous optical network units, the host digital terminal comprising:

a hardware unit;

a software unit, the hardware unit and the software unit in combination detecting the auto protection switching cell and generating an auto protection switching clear cell; and an auto protection switching register, to which copying of the virtual channel identifier field of the auto protection switching cell is performed by the hardware unit, and from which the virtual channel identifier field is read and set by the software unit;

wherein the host digital terminal detects abnormal states of an optical path connected to the host digital terminal, and performs a protection-switching function by receiving the asynchronous transfer mode cell from a first direction opposite to a second direction of an optical path faced with the abnormal states;

wherein the hardware unit of the host digital terminal receives the auto protection switching cell so as to perform copying of the virtual channel identifier field of the auto protection switching cell to the auto protection switching register; and wherein the software unit of the host digital terminal determines whether the auto protection switching cell is an alarm indication signal;

said apparatus further comprising means for performing the protection-switching function so as to receive the auto protection switching cell of an optical network unit, including an abnormal optical path indicated in the virtual channel identifier area of the auto protection switching cell, from a direction opposite to a second direction of the optical path having trouble when the auto protection switching cell is the alarm indication signal.

8. The apparatus of claim 7, said apparatus further comprising means for generating an auto protection switching clear cell, said generating means resetting all bits in the auto protection switching register;

wherein the hardware unit of the host digital terminal mirrors the auto protection switching register to the virtual channel identifier area of the auto protection switching cell, generates the auto protection switching clear cell, and transmits the auto protection switching clear cell to the optical network units.

9. The apparatus of claim 7, wherein the hardware unit of the host digital terminal detects an optical signal of the optical path, generates an interrupt when the optical signal is cut down, and reports the abnormal states of the optical path to the software unit of the host digital terminal; and wherein the software unit of the host digital terminal detects an intensity of the optical signal of the optical path, and abnormal states of the optical path when the intensity of the optical signal is lower than a critical value of the intensity.

10. The apparatus of claim 7, wherein the hardware unit of the host digital terminal mirrors the auto protection switching cell to the auto protection switching register, generates an interrupt, and reports the received data of the auto protection switching cell to the software unit of the host digital terminal sequentially.

11. The apparatus of claim 7, wherein the software unit of the host digital terminal examines a bit of an identification position of a node transmitting the auto protection switching cell among all bits of the auto protection switching register so as to decide whether the auto protection switching cell is the alarm indication signal.

* * * * *